May 5, 1970 J. L. STEWART 3,510,588

SPEECH SYNTHESIS METHODS AND APPARATUS

Filed June 16, 1967 5 Sheets-Sheet 1

INVENTOR.
JOHN L. STEWART
BY
Townsend and Townsend
ATTORNEYS

INVENTOR.
JOHN L. STEWART
BY
Townsend and Townsend
ATTORNEYS

INVENTOR.
JOHN L. STEWART
BY
Townsend and Townsend
ATTORNEYS

INVENTOR.
JOHN L. STEWART
BY
Townsend and Townsend
ATTORNEYS

INVENTOR.
JOHN L. STEWART
BY
Townsend and Townsend
ATTORNEYS

United States Patent Office 3,510,588
Patented May 5, 1970

3,510,588

SPEECH SYNTHESIS METHODS AND APPARATUS

John L. Stewart, Santa Clara, Calif., assignor to Santa Rita Technology, Inc., Menlo Park, Calif., a corporation of Arizona Filed June 16, 1967, Ser. No. 646,589
Int. Cl. G10l 1/00
U.S. Cl. 179—1 20 Claims

ABSTRACT OF THE DISCLOSURE

Apparatus and method for producing synthetic speech from real speech wherein two or three slowly varying measures from the output of an electronic analog cochlea are used to control and modulate the output signal of an oscillator to produce a whistle-type speech. The whistle speech is modulated to produce proto-type speech suitable for reception by the human ear. The prototype speech can be of the one-bump type providing only moderate intelligibility or can be of the two-bump type having better intelligibility along with improved naturalness.

My invention relates to the construction of synthetic speech from real speech by means of intermediary control signals which are constained to vary at relatively slow rates. More particularly, a simulation for the human ear and part of the neural system serves to provide two to three slowly varying measures which are subsequently employed with waveform generating apparatus to produce sounds that are acceptable to a human as speech.

In envisage a number of applications for my system, including speech bandwidth compression, conversion of speech to a form better suited for noisy environments or to overcome certain hearing disorders, and modification of speech so as to be better suited for recognition by animals other than man. Furthermore, the slowly varying measures submitted to the speech synthesizer can be used as inputs to computers for achieving automatic speech recognition. Still another application is to provide a new kind of musical instrument which produces a kind of singing.

My invention depends upon two basic systems as have previously been described by men, with improvements as will be delineated herein. One system is concerned with analysis of speech so as to provide slowly varying measures, and the other pertains to methods for synthesizing the speech.

The first system uses the "Electronic Analog Ear" which bears a Pat. No. 3,294,909, with improvements and extensions as are explained in co-pending patent applications, "Sound Analyzing System," Pat. No. 3,209,703 and "Method and System for Analyzing the Inner Ear," Pat. No. 3,432,618. Further improvements described herein augment these inventions with analog representations for some of the neural processing achieved in the inner ear and ascending neural pathways.

The second major part of my system has its roots in methods described in my copending applications "Speech Bandwidth Compression System," Pat. No. 3,387,093 and "Speech Processing System," Ser. No. 544,531 filed Apr. 22, 1966. Reference is made to those applications for the teachings thereof, but in the present case, methods deviate from previous ones in that what I call "Whistle Speech" is modulated in various ways so as to provide a number of versions of what I call "Prototype Speech."

The several technical details concerning my system will become evident in the ensuing discussion and figures of which FIG. 1 is a block diagram for the various parts of the ear undergo mechanical vibrations; and most particularly shown is the inner ear and a schematic illustrating the nature of the travelling wave characteristically contained therein.

FIGS. 2A and B show steady state characteristics of mechanical vibrations from the input of the cochlea to various positions along the basilar membrane in terms of frequency and distance.

FIG. 3 is a block diagram of the ear as before but with representation for inhibiting detection superimposed with characteristics patterns illustrated.

FIG. 4 details certain transient behavior of the inhibiting detector system when excited with a sine wave that changes abruptly in magnitude.

Figure 1:
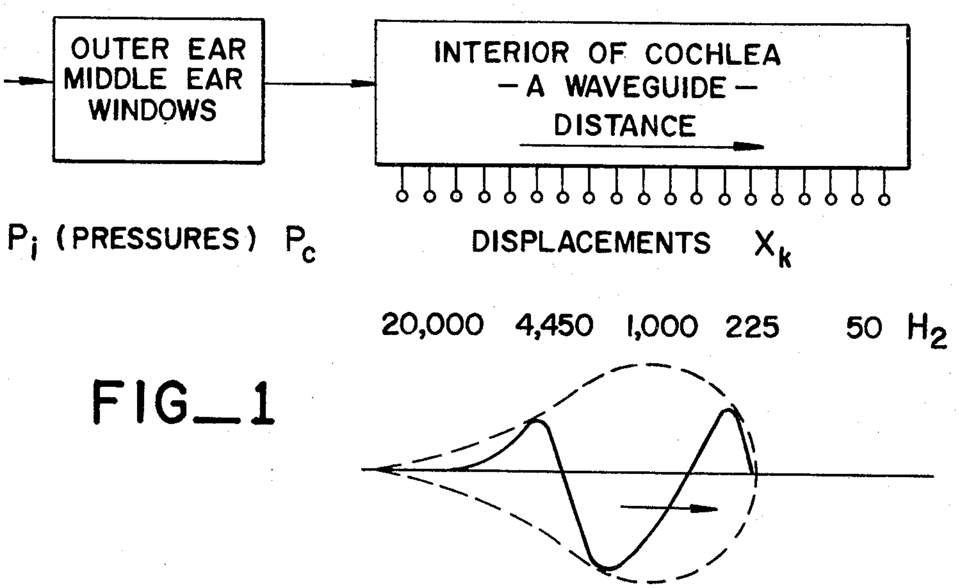

In FIG. 1, which is a block diagram for mechanical motions in the ear, the path of sound can be traced from application at the outer ear through the middle ear and into the inner ear or cochlea. In part this route effects an impedance transformation from air to the fluid filled cochlea. There is defined a pressure transfer function relating pressure across the basilar membrane barely within the cochlea to that at the outer ear. This transfer function is substantially high pass with a cutoff frequency of about 1000 Hz. below which the attenuation slope approximates 12 db per octave. Inertia of middle ear bones and other masses results in some attenuation of high frequencies, but this is not important until frequencies exceed those characteristic of speech.

Once within the cochlea a wave of transverse motions travels down the long elastic basilar membrane until it reaches a region of waveguide cut off. Reflections are minor, if existent at all. The lower is the wave frequency the further the wave penetrates and the larger become the magnitudes of transverse membrane displacements. Wave cut off frequencies are distributed logarithmically along the basilar membrane from 50 Hz. at the apex to 20,000 Hz. at the basal end.

For a sustained sinusoid, the travelling wave describes an envelope of vibrations which has long been interpreted as a frequency localization phenomenon. The usual presumption has been that the cochlea is a frequency analyzer but this notion must be handled with caution because frequency segmentation does not occur. For example, if two waves exist simultaneously, the lower frequency one effects the localization region of the higher frequency one more than conversely. The nonlinear processing that exists in conversion of mechanical variables to neutral form results in inability to explain composite patterns in terms of independently contributing influences. This asymmetric property of cochlear localization results in what the psychoacoustician refers to as differential masking.

Figure 2A:
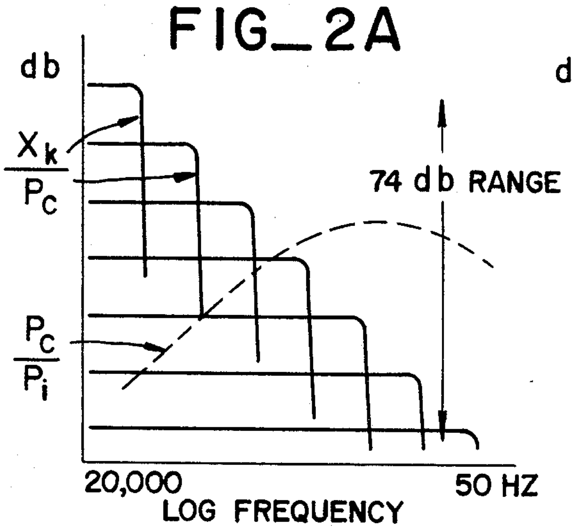

Steady state transfer functions can be measured and defined which relate each separate response displacement to pressure across the basilar membrane at the basal end. This family of transfer functions is represented in FIG. 2A. There results a system of low pass functions with cut off frequencies that relate logarithmically to distance along the basilar membrane. Scale factors on these low pass functions are also logarithmically related to position.

Figure 2B:
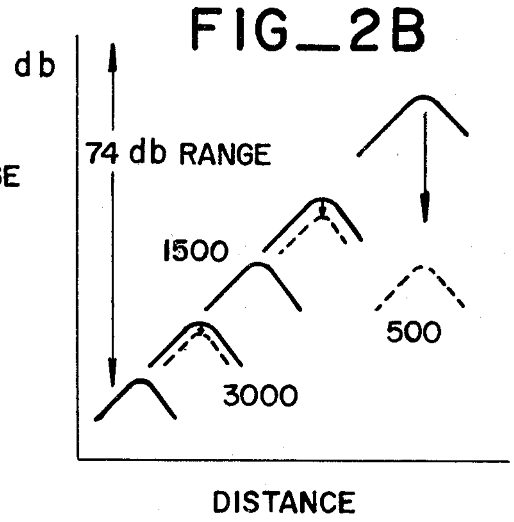

The localization curves, each of which applies at a fixed frequency, can be obtained directly from the low pass set by entering at the appropriate frequency and plotting attenuation while moving point by point vertically through the several curves. A set of these localization curves is shown in FIG. 2B.

The outer-middle ear transfer function superimposed on the low pass filter characteristics is shown dashed in FIG. 2A. The effect of the outer-middle ear on localization curves is to scale each curve in magnitude while not changing shapes using a linear db intensity scale. What happens is exemplified with the dashed curves in FIG. 2B.

It has been implied that cochlear response is measured in terms of basilar membrane displacements. Evidence suggests that velocities more directly relate to human behavior and neural excitation. Foregoing data can be made to apply for velocities simply by modifying the outer-middle ear transfer function in FIG. 2A with a constant 6 db per octave rising characteristic. This scales the various localization curves so that a plot of maximum response magnitude as a function of the corresponding frequency of maximum response approximates the curve for human auditory threshold.

Straightforward detection of basilar membrane vibratory amplitudes is not what actually occurs. If a sinusoidal stimulus is applied abruptly as from a switch, it propagates as a cochlear wave and establishes the envelope of a sine wave pattern as suggested by the larger solid curve in FIG. 3. The time required for this is little more than that appropriate to a single carrier cycle. The first group of neural pulses is patterned according to the envelope of membrane vibrations. But after a few milliseconds, detected signals begin to inhibit the detecting ability of neighboring detectors in an asymmetric manner so that the envelope of neural activity is appreciably less distributed along the cochlea than is that for mechanical activity—this sharpening is by a factor of 2 or 3 at mid-audio frequencies as shown by the smaller solid curve in FIG. 3.

It can be demonstrated that the sharpening process as outlined tends to approximate that required in an optimum filter for separating signals from noise. This is one of the many instances where we find that evolutionary pressures have tended to optimize the ear to the environment.

The primary criterion for perception of stimulus frequency, which obtains after inhibition has had its effect, appears to be based on the distance of penetration of a wave into the cochlea. For a complex signal consisting of a continuum of components entering the cochlea, the tendency will be for the lower frequency components to be best perceived. Furthermore, the stimulus must persist for at least a few milliseconds in order for the pattern sharpening effects of inhibition to provide assistance to resolution.

Figure 3:
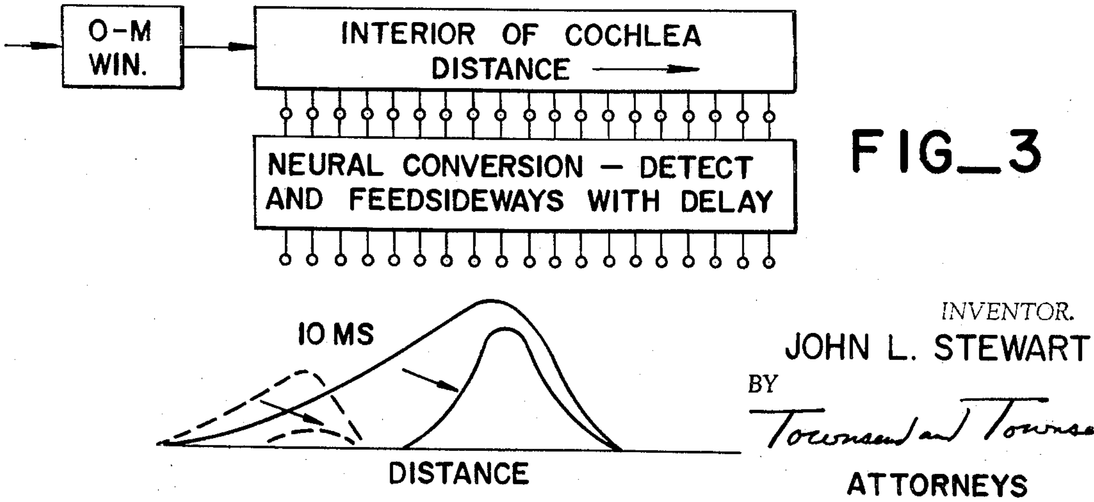

A dotted pattern in FIG. 3 denotes the presence of a second frequency component. It is difficult to see at a glance what will happen to its pattern or to the pattern for both components as a result of inhibition. It becomes progressively more difficult to figure out what happens when even more components are present. This is a situation where use of an analog model for computation is more revealing than are the mathematical relationships that rule system behavior.

Inhibiting effects are not uniform along the cochlea nor are they frequency independent. The time constant of delay or "latency" of inhibition is of the order of five to ten milliseconds. If mechanical fluctuations occur at comparable or slower rates, at least part of the inhibiting signal will dissipate before it can become effective. These things are not difficult to represent with circuit elements, but mathematical analysis becomes exceedingly difficult, especially for complex signals such as those for speech.

Figure 4:
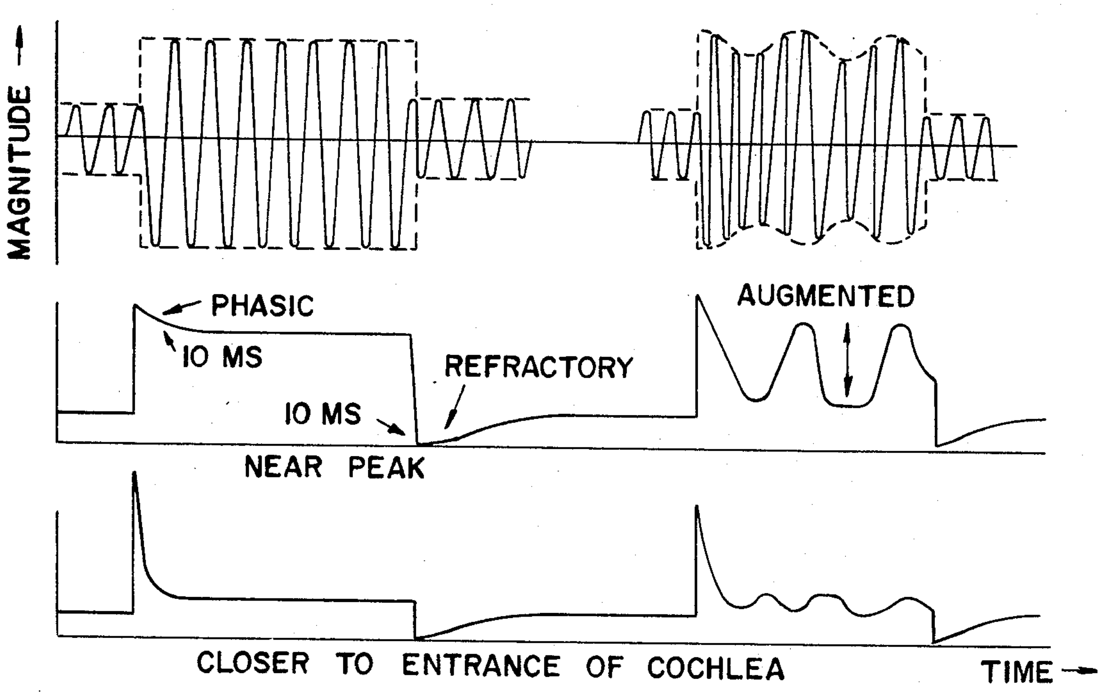

FIG. 4 denotes a stimulus that rises abruptly from a low level to a higher one and subsequently returns to a lower level. Some very characteristic transients in the neural signal are produced which depend in part on where along the cochlea the neutral signal is derived. We presume here that the neural signal comprises the average neural pulse rate in a bundle of fibers relating to a sizable patch of sensory cells. An initial overshoot, called phasic, is matched with an undershoot at the end of the tone burst. The overshoot is small for neurons near the localization point, but much larger, relatively, towards the entrance to the cochlea.

If the tone burst is modulated, as shown at the right of FIG. 4, the modulation may also be augmented in depth, provided the modulation frequency is neither too high such that neural valleys tend to blend together or too low where the inhibition time constant becomes too small relative to the period of modulation. Human fundamental voice pitch modulation fluctuations are in the range that is effectively augmented by inhibition.

Figure 5:
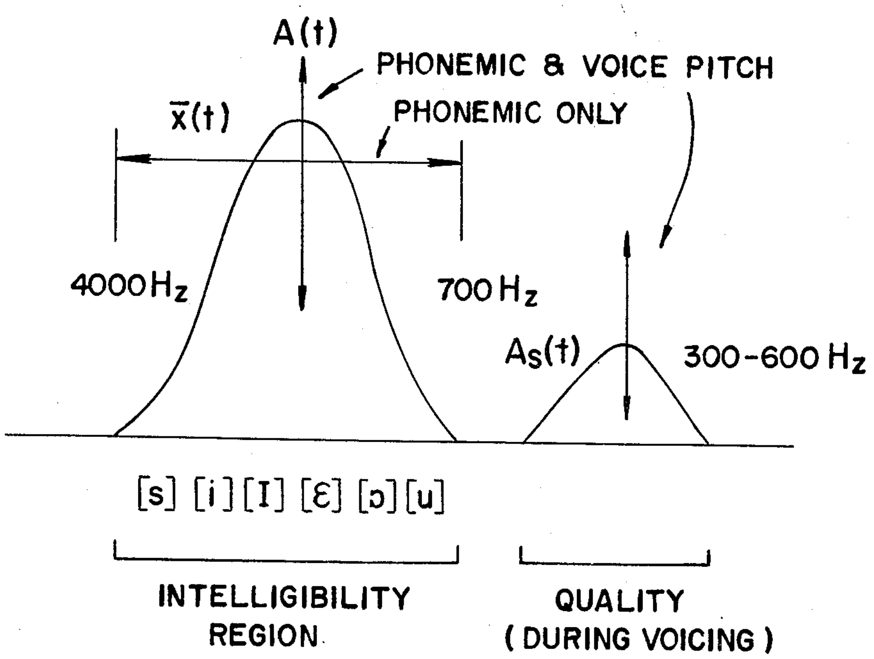
FIG. 5 illustrates and defines the two parts of the pattern observed on an ear with inhibiting detection when excited with speech.

FIG. 5 shows a sketch for a cochlear pattern from inhibiting detectors for a sustained voiced vowel sound such as [i] as in *heed*. The pattern displays a distinct two-bump characteristic. The bump on the right is present with most voiced sounds (not all) but is relatively small in the case of unvoiced sounds. It is also small for whispered speech. In addition, normal speech that has been passed through a high pass filter with a cut off frequency of 700 hertz does not give a rise to this bump; but such high pass filtered speech is virtually as intelligible as is unfiltered speech. We are thus led to identify the left bump as that contributing mostly to intelligibility while the right one is concerned with matters of quality.

Vertical fluctuations of the bumps in the pattern of FIG. 5 occur at both phonemic and voicing rates, whereas location of the principal bump varies at a phonemic rate and only slightly with voice pitch. The quality bump varies but little in location. The principal bump has a range for speech that covers a space interval between limits for localization to a pure sine wave of 700 and 4000 Hz. The various sustained sounds can each be cataloged as to the location of the principal bump as indicated in FIG. 5.

The intelligibility in speech can be conveyed with two waveforms representing position and magnitude of the principal bump. If rapid fluctuations are removed, only phonemic rate variations remain, which data can be conveyed on a channel with about 20 Hz. bandwith. Two such signals thus require a 40 Hz. bandwith. The speech that is implied by these measures is stereotyped—everywhere whipered or everywhere voiced in a monotone. A secondary voicing cue is provided by the amplitude of the quality bump, but if only low fluctuation rates are retained, the data are limited to the voiced/unvoiced distinction (although not uniquely so) without implying voice pitch or pitch inflection.

Having described in general the way in which patterns are produced for interpretation in the two regions of activity, it now is possible to discuss what is done with these pattern data in order to implement bandwidth compression and speech synthesis.

Bandwidth compression in the simplest case is effected by removing time measures $A(t)$ and $\overline{x}(t)$. Additional information obtains upon also acquiring the measure $A_S(t)$. These two or three measures are imposed on a suitable narrow band transmission circuit for reconstruction to the form of intelligible speech at the receiving end. The bandwidth required of $A(t)$ is approximately 20 Hz., and similarly for $\overline{x}(t)$. That required for $A_S(t)$ is appreciably less.

Figure 6:
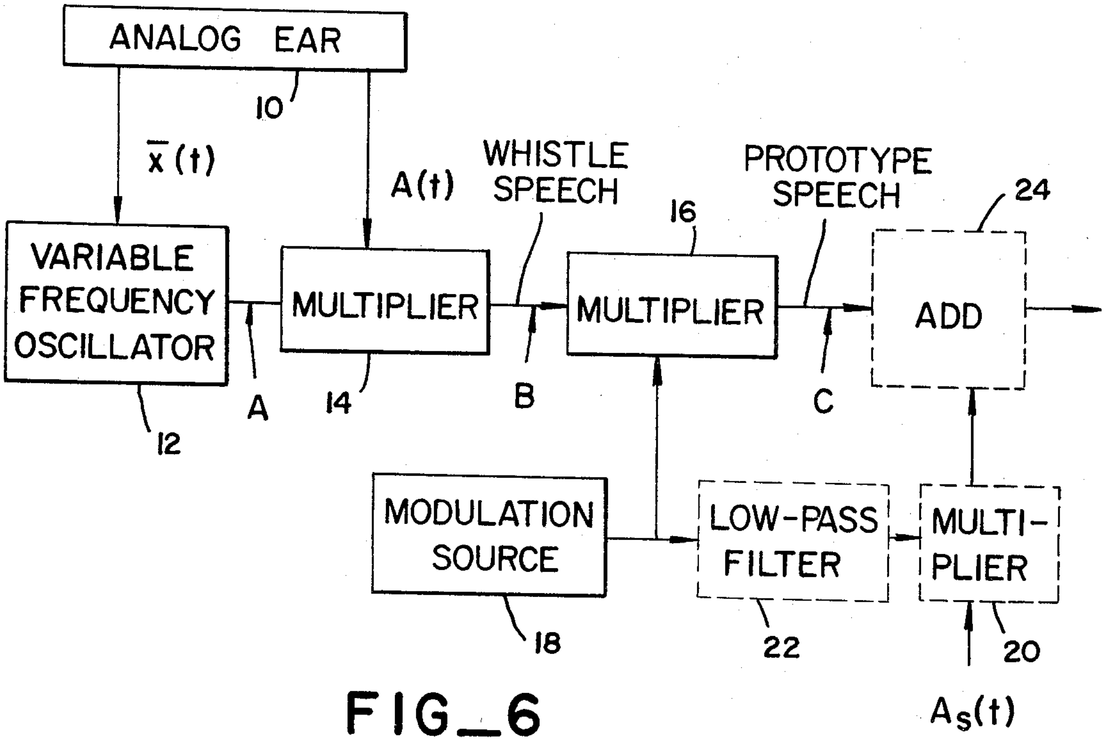
FIG. 6 is a block diagram of one embodiment of the apparatus for use with an analog cochlea in producing prototype speech from real speech.

With reference to FIG. 6 the measures $\overline{x}(t)$, $A(t)$ and $A_s(t)$ are derived from an analog ear 10 in the manner described in my above mentioned copending application "Speech Bandwidth Compression System," Pat. No. 3,387,093.

At the receiving end of the system the two measures $\overline{x}(t)$ and $A(t)$ are used to modulate a sine wave oscillator in amplitude and frequency respectively such as by application to a variable frequency oscillator and a multiplier respectively, so as to produce "whistle speech." The strategy of this is such that, if whistle speech is impressed on an analog ear, the size and location of the principal bump will vary instant by instant in close accord with the principal bump due to the original speech impressed on the analog ear at the sending end of the system.

The human brain can accept whistle speech with moderate intelligibility after practice. But the brain prefers a modulated sound to a pure one so that the modulation effects rapid fluctuations in $A(t)$ at typical voice pitch rates. If whistle speech is suitably modulated with a combination of perturbations, it becomes what we call "prototype speech." If modulation is random, the speech is of a whisper quality; and if the modulation is periodic there results a voice like sound. We find it best to amplitude modulate the whistle in bursts roughly like those deriving from glottal pulse stimulation of oral cavities in natural speech. This can be accomplished by passing whistle speech through a multiplier 16 modulated by a modulation source 18.

Figure 7:
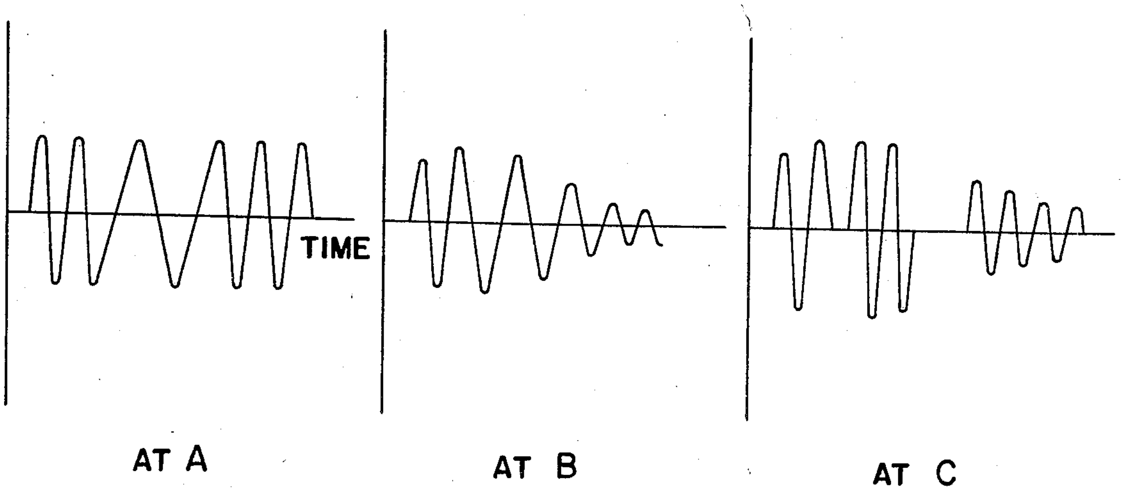
FIG. 7 is a graphic view of a cochlear pattern produced by an analog cochlea for a representative real sound at the input of the analog cochlea.

The nature of my speech synthesizer for whistle and prototype speech forms is shown in FIG. 6, along with typical waveforms in FIG. 7. In some cases it may be found advantageous to pertub the whistle speech frequently so that no trace of a steady carrier sine wave will exist. This can be done by superimposing a random signal on $\overline{x}(t)$, but not so that the special width of the whistle speech signal grows beyond a few hundred Hz.

As I stated earlier, the second bump is more likely to exist when speech is voiced than when it is unvoiced; specifically, when $A_s(t)$ becomes appreciable compared with $A(t)$, there exists a cue that the speech sound is voiced. This cue can be provided to the brain by causing synthetically generated sounds to become large in the 300–600 Hz. region in proportion to the magnitude of $A_s(t)$. The particular form of rapidly fluctuating waveform is not so important as is its existence. Nevertheless, its form should be consistent with the modulation imposed on whistle speech if the needs of naturalness are to be best served. Accordingly I use the same source of modulation 18 as is employed for prototype speech appropriately multiplied at 20 by $A_s(t)$ and added to prototype speech as shown with dashed elements in FIG. 6. I take precautions against having frequency components above 600 Hz. in this additive signal by using a low pass filter 22. At the same time, the harmonic content of the modulating signal must be large enough to give adequate signal strength in the 300–600 Hz. range, which will generally be achieved using discrete burst signals as implied in the waveforms of FIG. 7.

It will be appreciated that there exist many different ways to effect conversion of whistle speech to a variety of forms of prototype speech. I have listed but one broad class of procedures. A particularly simple special one uses a distorted form of whistle speech, namely square waves, with conversion to prototype form also with square waves. This particular speech form is especially interesting because the apparatus which generates it can be so simple—all waveforms can be generated with multivibrators and electronic switches, and amplitude modulation can be achieved with simple variable biased gates or clipping circuits.

Figure 9:
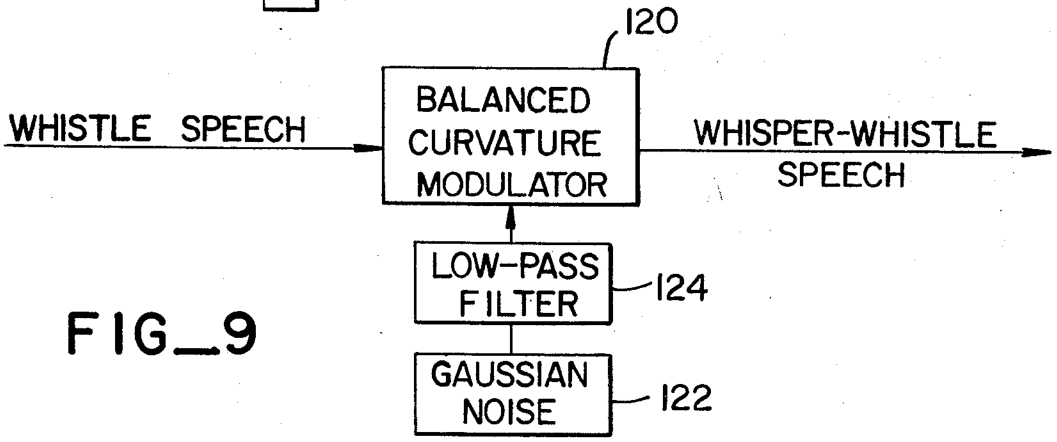
FIG. 9 is a block diagram which supplements the diagram of FIG. 8 for converting the whistle speech to whispered form.

Another specific method I used at one time with good results employed a linear balanced modulator as illustrated in FIG. 9. Whistle speech was converted to a sharply defined band of noise by applying low pass noise using Gaussian noise 122 and a low-pass filter, to one input of the modulator 120 and whistle speech to the other.

The important feature of prototype speech is that the modulation on the principal bump must contain a similar range of frequency components as exist in normal speech, namely in the range 50–250 Hz. Details of the modulation influence quality more than intelligibility. Many other distortions can be accepted. Modulation on the secondary bump, if used, should be similar to that on the primary bump.

As stated before, the secondary bump serves as a voiced/unvoiced indication, albeit this may not be the primary means that the real human brain uses for this cue. An especially useful speech form employs quasi-periodic modulation which can be caused to vary continuously from nearly uniform periodicity to a very random or raspy form by means of a control voltage. While speech is produced as previously described using all three measures, the ratio $A_s(t)/A(t)$ is employed to vary the relative purity of the speech. This gives a voiced/unvoiced control of considerable effectiveness to the human listener.

The various circuits which can be employed in the speech synthesizer may be practically self explanatory—most of them can actually be implemented with available commercial laboratory instruments. The form of the mutual inhibition detectors may not be so self evident. The scheme employed in detection is to back bias a detector partly with its own signal and partly with the signal from a neighboring section along the analog cochlea, in particular, a signal from the next lower frequency section (on a 24 section cochlea). This back biasing must be done with time delay of about 10 milliseconds, which I get with a resistance-capacitance circuit having this time constant.

Figure 11:
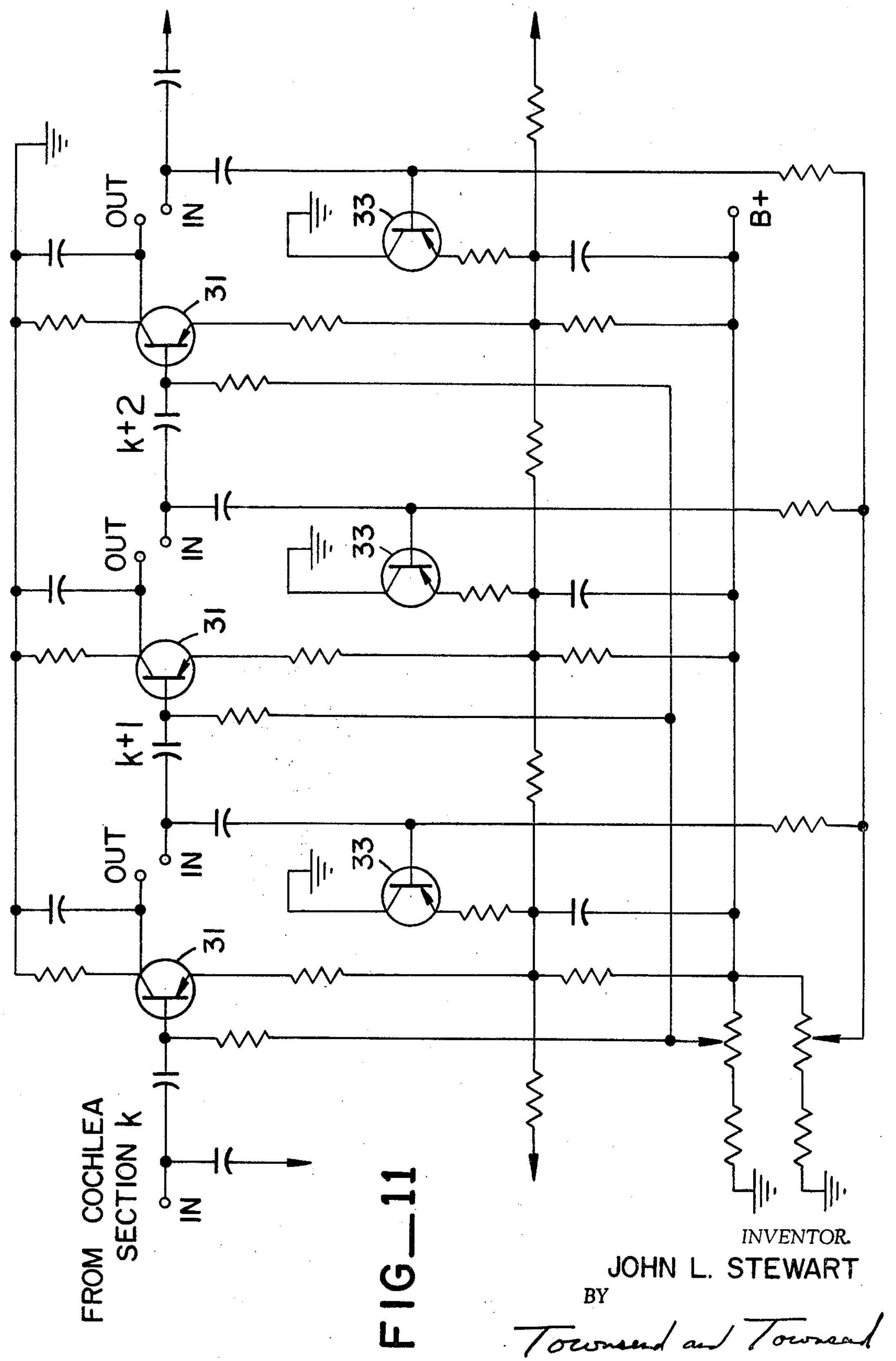
FIG. 11 is a fragmentary schematic view of a number of inhibiting detectors forming a part of the analog cochlea.

The particular circuit I have used employs two sets of cut-off-biased silicon transistors, one set (see 31 in FIG. 11) providing output across a collector impedance, and the other (see 33 in FIG. 11) serving only for effecting lateral section biasing. All units are interconnected in a row so that the effect of one biasing element is felt in both directions over the entire ear. But the principal effect is to the nearest detectors. FIG. 11 shows part of the detector array covering a sample of a few adjacent analog sections. Adjustments of biases is as follows:

All transistors without collector load impedances are biased well beyond cut off. The remainder are biased for no signal response voltages of about 50–100 millivolts. Then the cut off transistors are caused to conduct so that this 50–100 mv. is reduced towards but not quite to zero.

A variation of my speech synthesis system is that of not filtering the $A(t)$ measure too well so that voice pitch from the speech is conveyed by the system. Whistle speech is then caused to show envelope periodicities as in normal speech so that the voiced/unvoiced cue is automatically provided and even voice pitch fluctuations can be followed. This modification requires a narrow band for the $x(t)$ measure as before but that for $A(t)$ is raised to about 150 Hz. The $A_s(t)$ variable, if used, remains narrow band and controls intensity of $A(t)$ passed through the usual 600 Hz. low pass filter.

Figure 8:
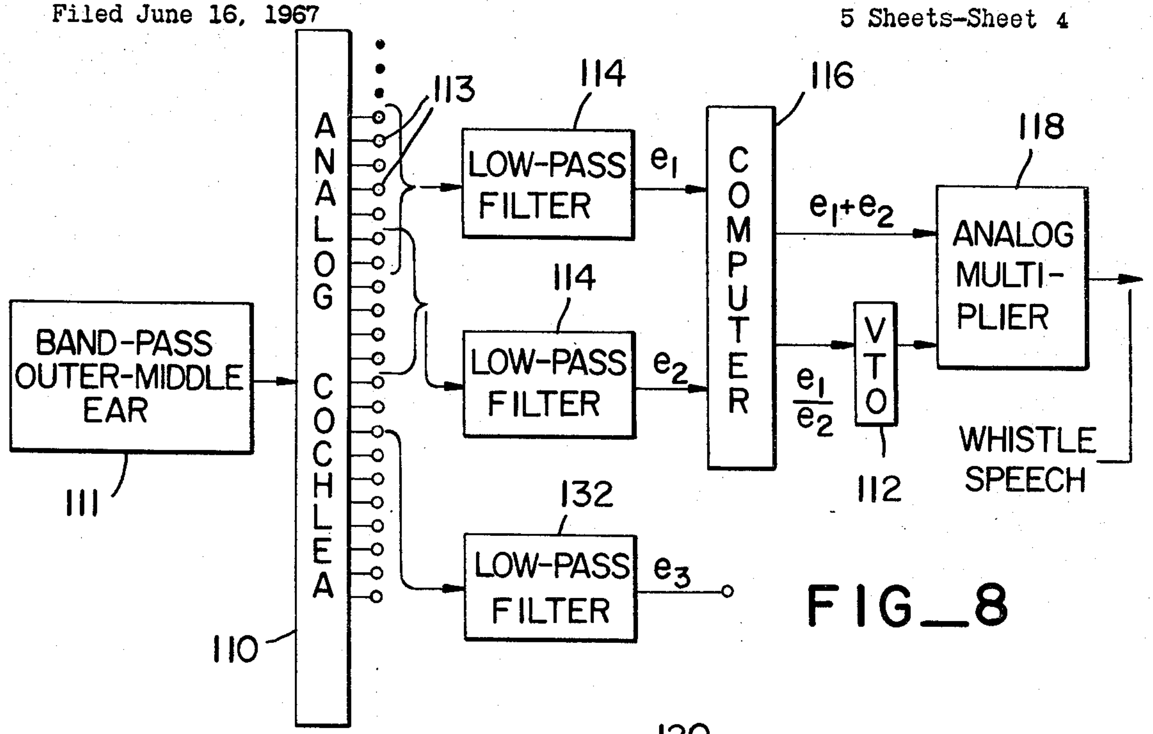
FIG. 8 is a block diagram of a second embodiment of the apparatus for producing whistle speech.
Figure 10:
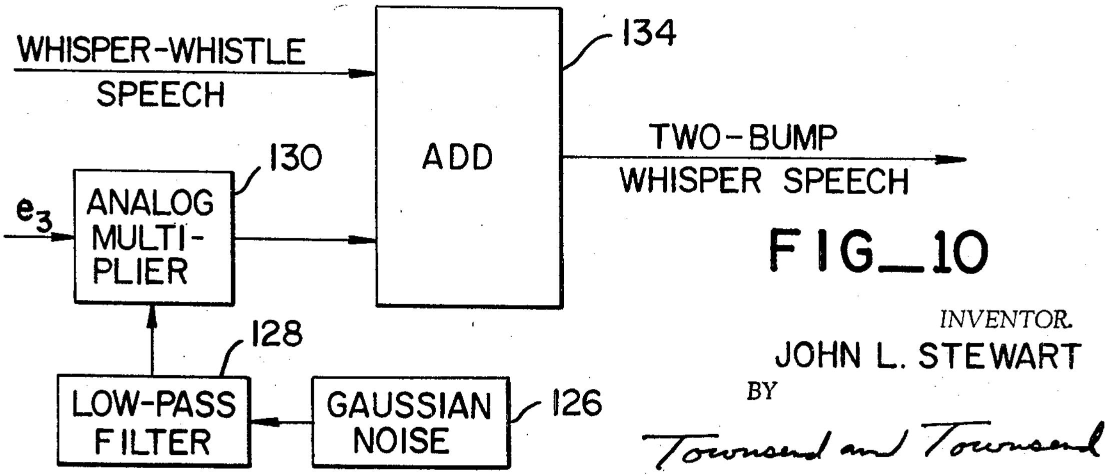
FIG. 10 is a block diagram which supplements the diagram of FIGS. 8 and 9 for producing two-bump whistle speech.

Another way of describing the production of whistle speech and prototype speech is shown in FIGS. 8–10 wherein an analog ear comprised of an analog cochlea 110 and an outer-middle ear 111 forming the input to the analog cochlea is coupled to a voltage turnable oscillator 112 for forming whistle speech. The analog cochlea has a plurality of output section 113 and, for purposes of illustration only, 24 such sections have been illustrated in FIG. 8.

From the analog cochlea, two different measures are extracted, namely, $e_1$ and $e_2$. The measure $e_1$ is obtained by summing the output signals of sections 4 through 10 and the measure $e_2$ is obtained by summing the output signal sections of 9 through 14. These measures are passed through low-pass filters 114 having a frequency cut off of approximately 30 Hz. The measures are then directed through a computer 116 to obtain a sum signal and a ratio signal which provide a loudness measure and a timbre measure, respectively; the timbre measure controls the frequency of oscillator 112 in the range of 700 to 4000 Hz. The loudness measure is passed through an analog multiplier 118 and then is used for modulating the amplitude of the signal of oscillator 112. The result is whistle speech.

The whistle speech is then directed through a balanced curvature modulator 120, wherein the whistle speech is converted to a sharply defined band of noise by applying Gaussian noise from a source 122 through a low-pass filter 124 to one input of modulator 120 while whistle speech is directed to another input of the modulator. The resulting signal is whisper-whistle prototype speech for random fluctuations. Periodic fluctuations give a voicing quality as mentioned above with respect to FIG. 6.

To incorporate the second pump of a cochlea pattern in the whisper-whistle speech, noise from a source 126 in FIG. 10 is passed through a low-pass filter 128 to an analog multiplier 130, at which location the noise amplitude is controlled by the measure $e_3$ from output section 17 of cochlea 10. This measure is passed through a low-pass filter 132 of the order of 5 Hz. before it is directed to multiplier 130. The whisper-whistle speech is then added by means of a computer 134 to the output of multiplier 130 to result in two-bump whisper speech.

The apparatus and method of this invention is suitable for a number of different applications including speech bandwidth compression, conversion of speech to a form better suited for noisy environments or to overcome certain hearing disorders, and modification of speech so as to better suited for recognition by animals other than man. Also, the slowly varying measures mentioned hereinabove can be used as inputs to computers for achieving automatic speech recognition. Still another application is to provide a new type of musical instrument which produces a kind of singing. The fundamental pitch of the human voice range is no higher than several hundred Hz. even during singing. Those musical instruments which often perform solo are frequently similarly constrained in overall range. In producing a monotoned voiced type of speech, whistle speech is modulated to prototype speech using a periodic or roughly periodic modulating signal. The harmonics of this same modulating signal may be added in accordance with the measure $A_S(t)$. If the frequency of the modulating signal is changed, the monotone voice pitch changes. The music form is produced by talking words of a song into a speech synthesizer while the tune is being played with some kind of instrument for use as a modulating signal. A variety of tonal qualities can be achieved by modifying the form of the modulating signal, for example, half sine waves or square waves or saw-tooth waves. Other quality factors can be varied depending upon the degree to which measure $A_S(t)$ is allowed to introduce components.

While several embodiments of this invention have been shown and described, it will be apparent that other adaptations and modifications of this device can be made without departing from the true scope of the invention described thus far.

What I claim is:

1. In apparatus for forming synthetic speech: an electronic analog cochlea having first means electronically simulating respective locations along a basilar membrane when the analog cochlea receives an input electronic signal corresponding to a sound to be analyzed and second means providing at least a pair of output electronic signals corresponding to the spatial pattern of basilar membrane activity simulated by the analog cochlea; a signal generating device having an output waveform; and means coupling said device to said second means to cause said output signals to modulate the frequency and amplitude of said output waveform to thereby produce said synthetic speech in the form of whistle speech.

2. In apparatus as set forth in claim 1, wherein is included a modulation source and a modulator, said modulator being disposed for receiving said whistle speech and for modulating said whistle speech by the modulation source to produce prototype speech of a first type.

3. In apparatus as set forth in claim 2, wherein the output of said modulation source is random, whereby said prototype speech has a whisper quality.

4. In apparatus as set forth in claim 2, wherein the output of said modulation source is periodic, whereby said prototype speech has a voice-like quality.

5. In apparatus as set forth in claim 2, wherein the output of said modulation source is applied in bursts.

6. In apparatus as set forth in claim 2, wherein said second means has a third output electronic signal corresponding to said spatial pattern, and means combining said third signal with said prototype speech of said first type to thereby produce prototype speech of a second type.

7. In apparatus as set forth in claim 6, wherein said modification source is disposed for modulating said third signal before the same is combined with said prototype speech of said first type.

8. In apparatus as set forth in claim 1, wherein said output electronic signals provide a measure of centroid and magnitude of said spatial pattern, and including a multiplier for receiving and amplifying said whistle speech.

9. In apparatus as set forth in claim 1, wherein said second means provides a plurality of output electronic signals, a first group of said output signals providing one measure of said spatial pattern and a second group of said output signals providing another measure of said spatial pattern, and wherein is included means for providing a signal corresponding to the sum of said measure and a signal corresponding to the ratio of said measure, said ratio signal and said sum signal being coupled to said device for modulating the frequency and the amplitude of said output waveform.

10. In apparatus as set forth in claim 1, wherein said second means includes a detector for each of said locations respectively, and means coupled with each detector respectively for biasing the same partially with its own signal and partially with the signal of a detector corresponding to an adjacent location.

11. In apparatus as set forth in claim 10, wherein said biasing means includes time delay structure for providing a time delay of approximately 10 milliseconds.

12. Apparatus for forming synthetic speech from real speech comprising: an analog ear having first means simulating a plurality of locations along a basilar membrane, second means for receiving the real speech and directing the same to said first means, and third means providing an output electronic signal for each of said locations respectively, with the output signals providing a representation of the basilar membrane activity simulated by said first means; means coupled with said third means for extracting from said output signals at least a pair of electronic signals providing measures of the spatial pattern of said basilar membrane activity; a signal generating device having a first output waveform; and means coupling said extracting means to said device to cause said spatial pattern signals to modulate the frequency and the amplitude of said output waveform to provide a second output waveform defining said synthetic speech in the form of whistle speech.

13. Apparatus as set forth in claim 12, wherein said output signals represent basilar membrane displacements, said spatial pattern signals defining the centroid and average magnitude of the spatial pattern provided by said displacements.

14. Apparatus as set forth in claim 12, wherein is provided a modulation source and a modulator, said modulator being disposed for receiving said second output waveform and for modulating said second output waveform by the modulation source and thereby providing a third output waveform defining prototype speech, said extracting means having a third electronic signal providing a third measure of said spatial pattern, and wherein is included means for modulating said third spatial pattern signal and for combining the same with said third output waveform.

15. A method of forming synthetic speech from real speech comprising: forming a pair of electronic signals representing the spatial pattern of basilar membrane activity corresponding to a real speech sound; generating a first waveform having uniform characteristics; and modulating the frequency and amplitude of said waveform with respective spatial pattern signals to thereby produce a second waveform said synthetic speech in the form of whistle speech.

16. A method as set forth in claim 15, wherein is included the step of modulating said second waveform to produce a third waveform defining prototype speech having intelligibility.

17. A method as set forth in claim 16, wherein is included the steps of forming a third spatial pattern signal, modulating said third signal, and combining the same with said third waveform to provide a fourth waveform representing prototype speech having intelligibility and quality.

18. A method as set forth in claim 16, wherein said second waveform is randomly modulated.

19. A method as set forth in claim 16, wherein said second waveform is periodically modulated.

20. A method as set forth in claim 16, wherein said second waveform is modulated in bursts.

No references cited.

WILLIAM C. COOPER, Primary Examiner

J. BRADFORD LEAHEEY, Assistant Examiner